United States Patent [19]

Montgomery

[11] 4,091,767

[45] May 30, 1978

[54] TREATING MATERIAL APPLICATOR FOR LIVESTOCK

[75] Inventor: Ronald R. Montgomery, Council Grove, Kans.

[73] Assignee: Dust Rack, Inc., Kansas City, Mo.

[21] Appl. No.: 735,836

[22] Filed: Oct. 26, 1976

[51] Int. Cl.² .................................... A01K 29/00
[52] U.S. Cl. ............................................ 119/157
[58] Field of Search .................. 119/157, 158, 159; 248/370, 163, 97, 166; 211/198, 199; 52/648

[56] References Cited

U.S. PATENT DOCUMENTS

| 1,055,288 | 3/1913 | Nolan | 119/157 |
|---|---|---|---|
| 1,710,314 | 4/1929 | Kyle | 119/157 |
| 1,800,602 | 4/1931 | Cole | 119/157 |
| 3,538,891 | 11/1970 | Williams | 119/157 |

*Primary Examiner*—Hugh R. Chamblee
*Attorney, Agent, or Firm*—Fishburn, Gold & Litman

[57] ABSTRACT

An applicator for applying treating material to animals upon activation thereof by an animal includes a base frame formed of a plurality of base members arranged to define a closed geometric figure preferably having three sides and a matching top frame supported above the base frame by a plurality of standards extending therebetween. Treating material applying means are suspended from each of the rail members of the top frame and positioned so that engagement thereof by an animal moving under the respective rail members effects application of treating material to the animal.

5 Claims, 5 Drawing Figures

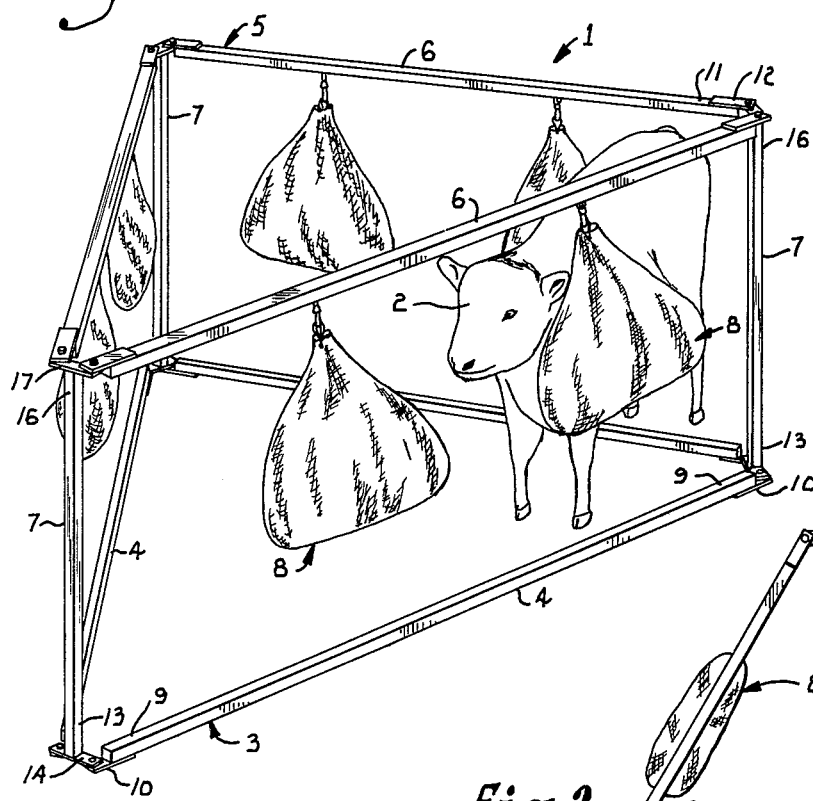
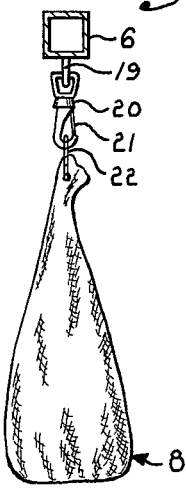
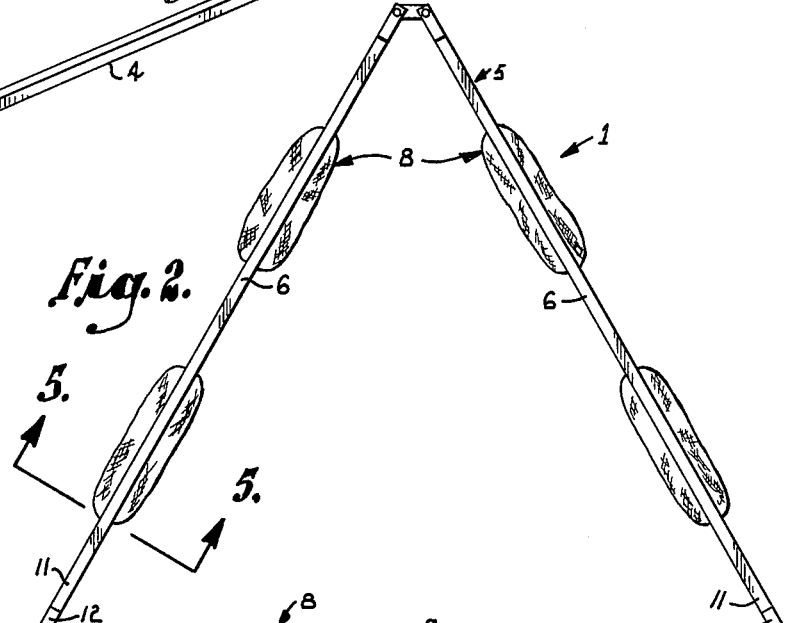
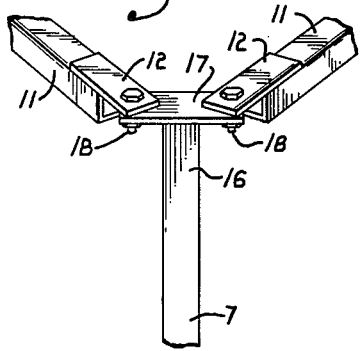
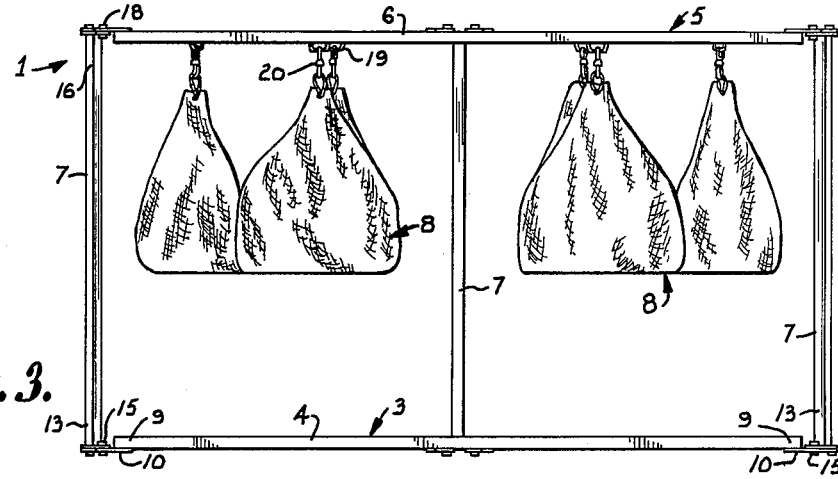

TREATING MATERIAL APPLICATOR FOR LIVESTOCK

The present invention relates to treating material applicators for livestock and more particularly to such an applicator supported on a structure having a base frame and a top frame each in the form of a closed geometric figure preferably having three sides.

The principal objects of the present invention are: to provide an applicator for applying treating material, such as an insecticide dust or liquid, to animals upon activation thereof by the animal for controlling insects, such as horn flies, face flies, lice, ticks, house flies, stable flies, and the like; to provide such an applicator to which animals needing treatment are attracted; to provide such an applicator wherein the applicator structure is generally triangular in top view thereby providing a highly stable structure; to provide such an applicator wherein treating material dispensers are spaced apart a distance such that at least one will be engaged by an animal moving under a respective rail member of the top frame of the applicator structure; to provide such an applicator wherein components of a support structure may be easily disassembled and reassembled for change of location; and to provide such an applicator for applying treating material to animals upon activation thereof by an animal which is economical to manufacture, durable in construction and particularly well adapted for the proposed use.

Other objects and advantages of this invention will become apparent from the following description taken in connection with the accompanying drawings wherein are set forth, by way of illustration and example, certain embodiments of this invention.

FIG. 1 is a perspective view of an applicator for applying treating material to animals and embodying features of the present invention.

FIG. 2 is a top plan view thereof.

FIG. 3 is a side elevational view thereof.

FIG. 4 is an enlarged fragmentary perspective view of a connection of two rail members of the top frame to a supporting standard.

FIG. 5 is a cross-sectional view through a rail member taken on line 5—5, FIG. 2.

Referring more in detail to the drawings:

In the disclosed embodiment of the present invention the reference numeral 1 designates generally an applicator for applying treating material to animals upon activation by contact therewith by an animal 2. The applicator 1 includes a base frame 3 formed of a plurality of base members 4 arranged to define a closed geometric figure, preferably having three sides for maximum stability. The device includes a top frame 5 formed of a matching set of rail members and supported above the base frame 3 by a plurality of generally vertical standards 7 extending between and connected to the corners of the base and top frames. Treating material applying means 8 are mounted on each of the rail members 6 and positioned so that engagement thereof by an animal 2 moving under a respective rail member 6 effects application of treating material to the animal 2. The base frame 3 is adapted to rest on a suitable supporting surface, such as the ground of a feed lot or pasture.

The base members 4 and rail members 6, in this example, are of square tubular shape in cross section, however, other structural cross sections such as tees, angles and round tubes may also be used with modification of the corner connectors.

The end portions 9 of the base members 4 each have a projection 10 here illustrated as planar members suitably secured or connected to the respective base member, as by welding.

The top frame rail members 6 are arranged so that each of the opposite end portions 11 thereof are adjacent a respective end portion 11 of an other rail member 6 and are arranged so that each of the rail members 6 are above a corresponding one of the base members 4.

The end portions 11 of the rail members 6 each have a projection 12 extending therefrom and corresponding to the projection 10 noted above.

The standards 7 each have a lower end portion 13 positioned between adjacent end portions 9 of a respective two of the base members 4. An end member 14 is mounted on the lower end portion 13 and, in this example, takes the form of planar members suitably secured or connected to the standard lower end portion 13, as by welding. The end members 14 have portions thereof extending laterally outwardly in opposite directions and which are engaged by the projections 10 of a respective two of the base members 4.

Suitable fastening means, such as bolts 15, engage the projections 10 and the respective end member portions 14 for pivotally connecting the base members 4 and the standard lower end portions 13 together. The bolts 15 permit folding at the connection, or, in the alternative, are removable so that the base frame and standards may be disassembled and reassembled in an other location.

The standards 7 each have an upper end portion 16 positioned between adjacent end portions 11 of a respective two of the rail members 6. End members 17, corresponding to the members 14, are mounted on the upper end portion 16 of the standards 7 and are connected in the same manner to projections 12 of a respective two of the rail members 6 by suitable fastening means, such as bolts 18. The standards 7 thereby support the top frame 5 above the base frame 3 and provide a substantially rigid structure for supporting the treating material applying means 8.

The applicator 1 for applying treating material to animals upon contact thereof by an animal 2 includes the treating material applying means 8 mounted on the top frame rail members 6. The treating material applying means 8 is illustrated as a plurality of containers each depending from a respective one of the rail members 6. The containers are formed of porous material, such a burlap or the like, through which insecticide powder or dust will pass when engaged by an animal 2.

Each of the containers is swingably positioned and located so that limited free movement is effected by engagement thereof by an animal 2 and at least one container remains in contact with the animal so long as any part of the animal is within the framework. In the illustrated embodiment, the rail members 6 each have a plurality of longitudinally spaced eyelets 19 mounted on and depending from a lower surface thereof. The eyelets are located with respect to each other, taking into consideration the expected size of the animal, so that its random wandering through the closed framework will always result in treating contact with the containers as the animal passes under a rail member 6. A suitable hook device 20 is mounted in each of the eyelets 19 and depends therefrom with a suitable keeper 21 thereon to retain a support loop 22 within the hook device 20. The support loops 22 connect to respective containers and are operative to close an upper portion thereof.

The arrangement described is easily portable from place to place, either in the fully assembled form (it may be placed on a pick-up truck) or folded or disassembled, as desired. Due to its rigid configuration, it is not necessary to anchor a portion into the ground and the movement of the arrangement by contact with the animals will not normally produce upset or damage.

It is to be understood that while one form of this invention has been illustrated and described, it is not to be limited to the specific form or arrangement of parts herein described and shown, except insofar as such limitations are included in the following claims.

What I claim and desire to secure by Letters Patent is:

1. An applicator for applying treating material to animals upon actuation thereof by an animal, comprising:
   (a) a plurality of elongated base members each having opposite end portions, said base members being arranged so that each end portion thereof is adjacent a respective end portion of an other base member;
   (b) a plurality of standards each positioned between adjacent end portions of a respective two of said base members, said standards each having an upper end portion and a lower end portion;
   (c) connection means on the lower end portion of each of said standards and on each of the end portions of said base member for connecting said standard lower end portions to the adjacent end portions of the respective two of said base members;
   (d) a plurality of elongated rail members each having opposite end portions, said rail members being arranged so that each end portion thereof is adjacent a respective end portion of an other base member, each of said rail members being above a respective one of said base members a distance to permit an animal to walk thereunder
   (e) second connection means on the upper end portion of each of said standards and on each of said end portions of said rail members for connecting said standard upper end portions to the adjacent end portions of the respective two of said rail members; and
   (f) treating material applying means mounted on each of said rail members and positioned so that engagement thereof by an animal moving under said respective rail member effects application of treating material to the animal.

2. An applicator as set forth in claim 1 wherein:
   (a) said first named connection means includes:
      (1) a plurality of projections each extending from a respective end portion of a respective one of said base members;
      (2) an end member for the lower end portion of each of said standards; and
      (3) fastening means for connecting each of said projections to a respective end member; and
   (b) said second connection means includes:
      (1) a plurality of projections each extending from a respective end portion of a respective one of said rail members;
      (2) an end member for the upper end portion of each of said standards; and
      (3) fastening means for connecting each of said projections to a respective end member.

3. An applicator as set forth in claim 1 wherein:
   (a) said connection means are pivotal connection means.

4. An applicator as set forth in claim 1 wherein:
   (a) said base members are arranged to define a rigid geometric figure having three sides; and
   (b) said rail members are arranged to define a geometric figure having three sides and positioned above said geometric figure defined by said base members.

5. An applicator for applying treating material to animals upon actuation thereof by an animal and comprising:
   (a) a base frame formed of a plurality of base members arranged to define a closed geometric figure having at least three sides;
   (b) each of said base members including opposite end portions and a respective projection extending from each base member end portion;
   (c) a top frame formed of a plurality of rail members arranged to define a closed geometric figure having at least three sides;
   (d) each of said rail members including opposite end portions and a respective projection extending from each rail member end portion;
   (e) a plurality of standards each extending between and connected to said base frame and to said top frame and thereby supporting said top frame above said base frame;
   (f) each of said standards including opposite upper and lower end portions and a respective end member thereon;
   (g) said end member on the lower end portion of said standards each engaging the projection extending from a respective two of said base members;
   (h) said end member on the upper end portion of said standards each engaging the projection extending from a respective two of said rail members;
   (i) fastening means engaging each projection of each of said base members and said rail members and a respective one of said end members of said standards for connecting same together; and
   (j) treating material applying means mounted on each rail member of said top frame and positioned so that engagement thereof by an animal moving under said respective rail member effects application of treating material to the animal.

* * * * *